United States Patent

[11] 3,622,868

[72] Inventor Joachim H. Todt
3903 West 109th Ave., Crown Point, Ind. 46307
[21] Appl. No. 9,143
[22] Filed Feb. 6, 1970
[45] Patented Nov. 23, 1971

[54] REGULATING POWER TRANSFORMER WITH MAGNETIC SHUNT
27 Claims, 17 Drawing Figs.

[52] U.S. Cl. .................................................. 323/56,
323/89 C, 323/89 AG, 336/155
[51] Int. Cl. ..................................................... H02p 13/12,
G05f 1/22
[50] Field of Search .............................................. 323/6, 44,
56, 57, 58, 62, 89, 89 C, 92; 336/155, 160; 330/8

[56] References Cited
UNITED STATES PATENTS
2,455,078 11/1948 McCreary .................. 323/89 C
2,706,271 4/1955 Fletcher ....................... 323/60 X
2,844,804 7/1958 Roe ............................. 323/56 X FOREIGN PATENTS
554,476 1957 Belgium ...................... 323/89 C Primary Examiner—Gerald Goldberg
Attorney—Schroeder, Siegfried and Ryan ABSTRACT: A regulating power transformer consisting of a primary winding and a secondary winding positioned coaxial on the center leg of an E-type stack of magnetic lamination pack which is separated by a layer of I-type laminations having two coils wound thereon, the latter fitting into the windows of the E-type lamination. The I-type laminations provide the function of the magnetic shunt for the flux generated by the primary coil and serve as the magnetic coupling between the E-type laminations on the primary side of the transformer and identical E-type laminations on the secondary side of the transformer. Saturation of the shunt path to various degrees through control of the excitation of the coils mounted on the I-type laminations varies the amount of bypassed or shunted magnetic flux making it available at the secondary coil in a substantially linear proportion to the DC excitation. The transformer uses less iron, is faster in response than conventional regulating transformers and has an improved output wave form.

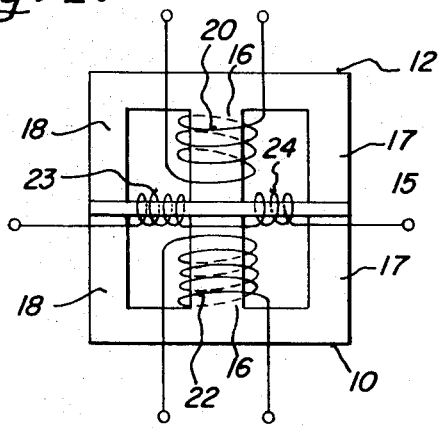
Fig. 1.
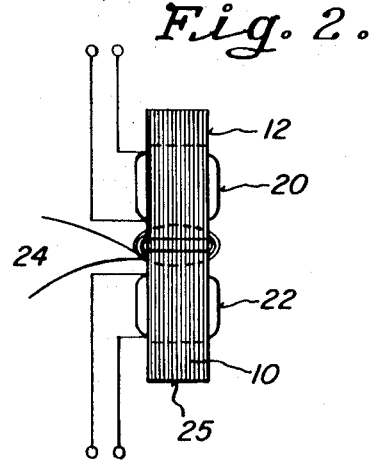
Fig. 2.
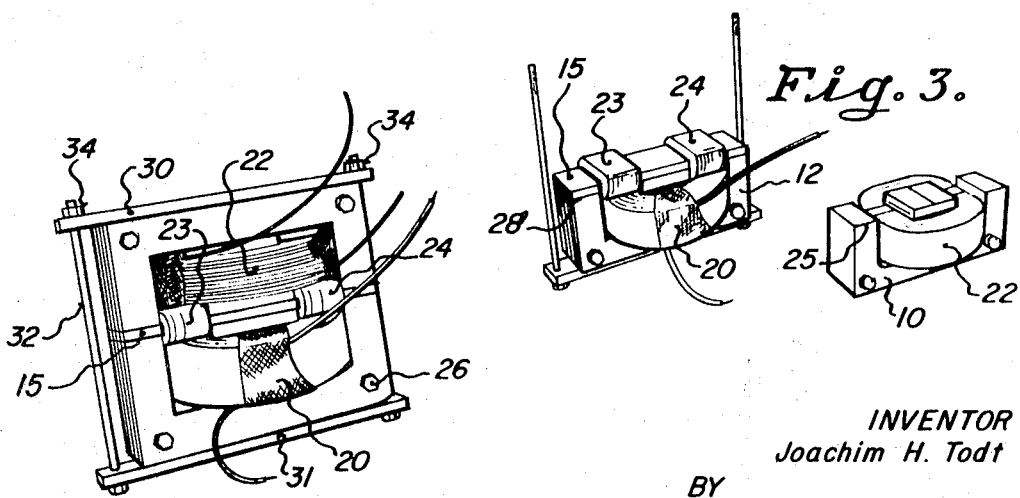
Fig. 5.
Fig. 4.
Fig. 3.
INVENTOR
Joachim H. Todt
BY Schroeder Siegfried & Ryan
ATTORNEYS INVENTOR
Joachim H. Todt
BY
Schroeder Siegfried & Ryan
ATTORNEYS Fig. 16.
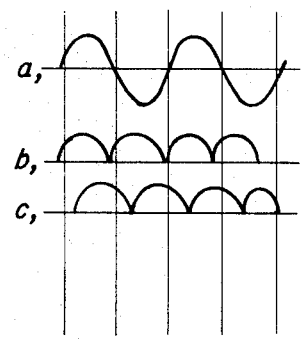
Fig. 17.
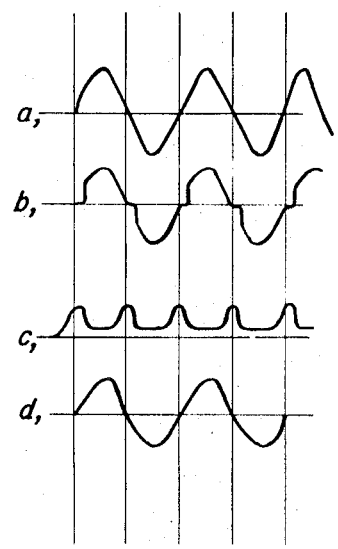
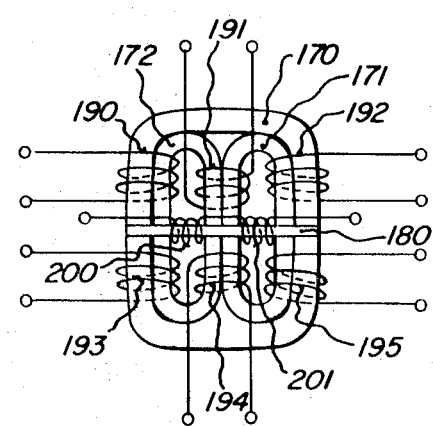
Fig. 15.
INVENTOR
Joachim H. Todt
BY
Schroeder Siegfried & Ryan
ATTORNEYS

REGULATING POWER TRANSFORMER WITH MAGNETIC SHUNT

My invention relates to regulating power transformers and more particularly to an improved regulating power transformer utilizing a variable magnetic shunt.

Regulating power transformers, constant voltage transformers, and voltage regulating transformers are known and in use. Such structures take a variety of forms, that is, magnetic circuits that normally require special regulating equipment, sensors and control apparatus. The most well known of this type of apparatus is the constant potential transformer, known as the Sola transformer. It utilizes a relatively complicated two piece magnetic circuit with an air gap therebetween requiring large amounts of iron and special regulating coils. Such a transformer compensates for input variations over a wide range, but presents a significant wave distortion in its output. Another known method of regulation is the use of a conventional transformer with a saturable reactor. Such a combination of elements also requires large amounts of iron with special windings and has the disadvantage of having slow reaction times. Other types of voltage regulating transformers utilize special magnetic circuits requiring special laminations and large amounts of iron with special coil configurations to be mounted thereon. Still other regulators include additional sensing and amplifying and feed back equipment to satisfactorily perform the regulation. Thus, prior transformers of this type all have one or several of the following disadvantages: output wave form distortion, large magnetic circuits with excessive amounts of iron compared with conventional transformers, complicated magnetic circuits requiring special laminations, special coil configurations requiring special winding operations, large number of coils, slow response time, auxiliary control equipment and rectifiers in circuit with windings, and relatively high cost.

The present invention is directed to improvements in a regulating power transformer which overcomes all of the major objections to current available equipment of this type. The improved power transformer has an output which can be controlled over a wide range of different loads and input voltage fluctuations. It employs conventional transformer laminations in a simplified one piece construction with no air gaps in the magnetic path. In its preferred form it utilizes standard E-shaped or C-shaped laminations to define a conventional transformer configuration without interleaving of laminations or specialized laminations and upon which preformed conventionally would primary and secondary windings are positioned in a coaxial relationship. The improved transformer employs standard I-shaped laminations in stacks of varying thicknesses to provide a magnetic shunt between the core pieces formed by the standard laminations such that the leg faces abut the shunt portion providing a compact single pieced transformer construction. Preformed control windings are positioned on the magnetic shunt and fit into the window portions of the laminations to add to the compactness of the structure such that simplified securing constructions may be employed to hold the transformer in assembled relationship. The resultant transformer utilizes only a small increase in the amount of iron over a conventional transformer and eliminates the necessity of separate cores or specialized core configurations with attendant coil winding problems. The magnetic shunt formed by the I-shaped laminations varies the coupling between the primary and secondary windings and direct current energization of the control windings on the shunt varies ferropermeance or saturation thereof to provide a desired regulated output with an output wave from having a minimum of distortion. The resultant transformer has substantially the same characteristics as the transformer saturable reactor combination without its mass and cost, and with a one piece transformer design. The resultant transformer provides a simplified construction for a regulating transformer having varied applications, as will be hereinafter noted, with a minimum of auxiliary equipment and in which wave form improvement can be effected in a simplified manner.

Therefore it is the principal object of this invention to provide an improved power regulating transformer whose output can be controlled over a wide range of different loads and input voltage fluctuations.

Another object of this invention is to provide in a transformer of this type a regulated output which is controlled substantially instantaneous, that is without the inherent delay of other magnetic amplifier type controls known and in use.

A further object of this invention is to provide a regulating power transformer in which any regulation accuracy required may be obtained by choice of sensitivity of a controlling amplifier.

A further object of this invention is to provide a regulating power transformer which utilizes standard transformer laminations or tape wound C-type cores and I-shaped stamped laminations, thus eliminating the need for special tooling of transformer laminations.

A still further object of this invention is to provide an improved regulating transformer which is essentially a one piece construction with a minimum of increase of iron over a conventional transformer.

Another object of this invention is to provide an improved regulating power transformer which utilizes conventionally wound coils.

It is also an object of this invention to provide a regulating power transformer in which the percentage of regulation may be varied by simply varying the thickness of the magnetic shunt.

Another object of this invention is to provide an improved regulating transformer which employs no air gaps in the magnetic flux path.

A further object of this invention is to provide an improved regulating power transformer for a variety of applications and where less precise regulation is required to eliminate any solid state control devices other than rectifiers.

A further object of this invention is to provide an improved regulating power transformer which is capable of remote control of regulation from sources completely divorced, that is no ohmic or circuit connection, with the power input or power output of the transformer.

A still further object of this invention is to provide an improved regulating power transformer capable of constant current or constant voltage output with varying input voltage which does not require any feed back.

It is also an object of this invention to provide a regulating power transformer which is relatively low in cost and easy to use and maintain.

These and other objects of this invention will become apparent from the reading of the attached description together with the drawing wherein:

FIG. 1 is a schematic plan view of one embodiment of my improved regulating power transformer utilizing E- and I-type transformer laminations.

FIG. 2 is a schematic side elevation view of the embodiment shown in FIG. 1.

FIG. 3 is a perspective view of the embodiment of FIG. 1 in a disassembled relationship showing the shape and relationship of parts.

FIG. 4 is a perspective view of the regulating power transformer of FIG. 3 in assembled relationship.

FIG. 5 is an exploded perspective view of another embodiment of my invention utilizing C-shaped tape wound transformer cores and I-type laminations.

FIG. 15 is a schematic view of still another embodiment of the transformer showing a plurality of primary and secondary windings controlled thereby.

FIG. 16 is a graphic disclosure of wave forms applied to the primary and control windings of the transformer to show variations in types of control to be obtained therefrom, and FIG. 17 is a composite of graphs showing varying output wave forms plus input wave forms and an output wave form for the transformer showing control of output wave form therefrom.

Figure 6:
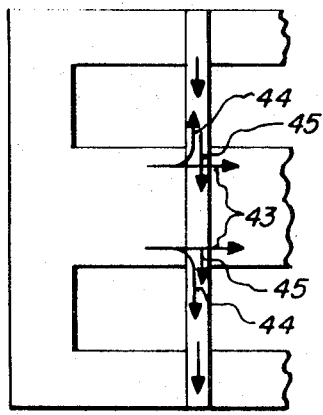
FIG. 6 is a schematic view of a portion of the core of my regulating power transformer showing lines indicative of flux flow therethrough.

My invention in am improved regulating power transformer with magnetic shunt is shown in FIGS. 1–4 of the drawings as applied to a transformer using standard E- and I-type transformer laminations. In FIG. 1, the transformer employs a pair of E-shaped core members 10 and 12 which are positioned with the leg extremities in near abutting relationship and with an I-shaped or straight bar type core member indicated at 15 positioned between the faces or ends of the legs of the E-shaped core members. As will be later noted, suitable means are provided to hold the elements of the magnetic circuit, that is the cores 10, 12 and 15 in assembled relationship to provide a magnetic circuit which is substantially continuous and has no air gap therein. The E-shaped cores have a central leg 16, which in its preferred embodiment, will have twice the cross-sectional area or surface as the outer legs 17 and 18 to provide a magnetic circuit which is substantially uniform in cross section. The I-shaped core member 15 will provide a magnetic shunt path from the central leg to the outside legs of the composite core structure for purposes to be later noted. The resulting core structure is a single piece structure of standard component parts which will use simplified preformed coils thereon. Thus in FIGS. 1 and 2, the primary winding is shown at 20 as mounted on the central leg of one core member 12 with the secondary winding, indicated at 22, being mounted on the central leg 16 of the core member 10 to be coaxial with the primary winding. A pair of control windings 23, 24 are positioned along the extent of the I-shaped core member and within the confines of the magnetic circuit or the windows in the core members.

In FIG. 2 it will be seen that the core members 10 and 12 are identical in structure and employ conventional E-type laminations which are held together in a stacked relationship through suitable means, such as glueing or bolts (not shown), with the I-shaped core member 15 similarly employing laminations of the same thickness and disposed in the same plane as the laminations in the E-shaped core member 10 and 12. Thus the magnetic circuit will have the same magnetic permeability throughout, and control of the coupling between the primary and secondary winding thereof, as will be hereinafter explained, will be determined by the control of the magnetic flux through the shunt formed by the I-shaped core member. FIGS. 3 and 4 show an example of the actual construction of a regulating transformer employing E- and I-type laminations in assembled and disassembled relationship to disclose the relationship of parts. In FIGS. 3 and 4, the E-shaped laminations 25 forming the E-shaped core members 10 and 12 are held together by suitable nuts and bolts 26 and preformed primary 20 and secondary windings 22 are positioned on the central leg to substantially fill the window in the core. The I-shaped core member 15, which is shown formed of a plurality of I-laminations 28, which are similarly held together through suitable means, such as glueing, have preformed coils 23, 24 mounted thereon which are wound to such dimension as to fill the portion of the windows or the area within the two E-shaped core members not filled by the windings 22, 24. This structure is held in assembled relationship by means of a pair of bars 30, 31 which are connected together by suitable bolts 32 and nuts 34 to clamp the core members in assembled relationship. This type of holding structure could be modified or a metallic strap substituted therefore as in conventional transformer manufacture.

FIG. 5 shows substantially the same magnetic circuit construction employing C-shaped core members 32 wherein pairs of C-shaped core members, positioned with leg portions in side-by-side relationship, form the equivalent of the E-shaped core member so as to receive preformed primary and secondary windings 35, 36 and with a straight bar type core or I-shaped lamination 38 positioned therebetween. Control windings 40, 41 are distributed on the I-shaped core member and the core member may be a single lamination of a predetermined thickness or a plurality of laminations having a width dimension similar to the width dimension of the C-shaped core members. The resultant magnetic structure will provide a circuit in which the C-shaped core members will have a different magnetic permeability than the I-shaped core member 38 and the percentage of regulation obtained therefrom, as will be hereinafter noted, will depend on the dimensional tolerances or thickness of the I-shaped core member and the permeability of the same. In this embodiment, however, the C-shaped core members are formed by conventional tape winding procedures with the leg face surfaces lapped in a conventional manner. The resulting structure is held together through a suitable clamping means, such as is shown in FIG. 4, or by a metallic strap wound around the same in a conventional manner.

The regulating transformer structures of FIGS. 1–5 employ conventional laminations or cores and preformed coils to provide a regulating transformer which has substantially the same characteristics as a saturable reactor transformer combination but which provides such characteristics with a simplified magnetic structure and basically a one piece design. It further requires less iron and is made like an ordinary transformer except that the laminations are not interleaved. The primary and secondary windings are positioned in a side-by-side coaxial relationship and while providing a somewhat looser coupling than in a conventional transformer does provide the desired regulation. The DC control windings are connected in a series circuit such that their polarities aid one another and in a series circuit configuration such that alternating current EMF generated by the primary flux flow in the coils cancels out and no AC voltage appears at the circuit terminals. The individual control windings will preferably be operated in a range from 75 to 100 volts DC using a large number of turns as practical in order to achieve control with a small direct current if the speed of response can be slow. Compared with a saturable reactor, my improved regulating power transformer achieves an economy in design in that it employs only two coils on a piece of magnetic material. Another significant difference between such structures is found in the fact that the cross section of the saturable magnetic shunt is a fraction of the main magnetic power path compared with the large amount of added iron in the saturable reactor. Typically, high efficiency is obtained in a regulating power transformer using E- and I-laminations in which the cross section of the magnetic shunt path is from one-quarter to one-eighth of the return legs of the main transformer path or one-eighth to one-sixteenth when referring to the center iron leg; or using tape wound cores and I-laminations in a ratio of 5 to 20 percent of the cross section of the main flux path.

Another improvement over the saturable type reactor device is the response time of the improved regulating power transformer. The magnetic shunt path is used in two different directions normal to one another. The normal alternating flux magnetic path of the magnetic circuit is perpendicular to the extent of the magnetic shunt strip, while the DC path is lengthwise of the shunt. Thus in FIG. 6, the arrows indicated at 43 represent direction of instantaneous flux flow through the core members and shunt for normal coupling while the arrows 44 represent the main flux flow which is shunted through the magnetic shunt. Similarly, the arrows 45 represent the flux flow through the magnetic shunt from the direct current energization. The resultant flux path which alternates with the DC flux aiding and opposing the shunted flux flow from the primary winding results in a significantly faster response time in the improved regulating transformer than is obtained in conventional saturable reactor devices. The magnetic domains in the laminations rotate their direction in the area of intersections which is a much faster process than sidewise movement as in a conventional saturable reactor. Thus the response time in the present regulating transformer is substantially instantaneous.

Figure 7:
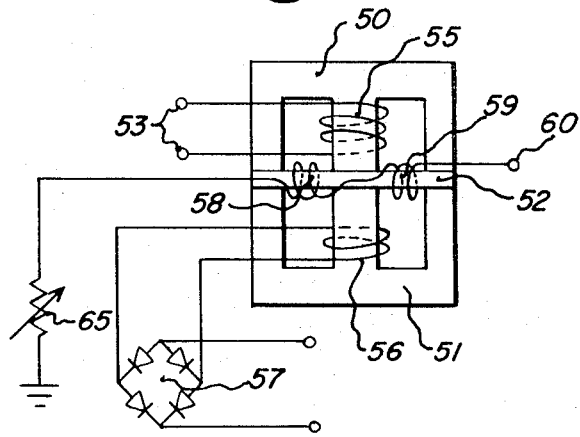
FIG. 7 is a schematic view of the improved regulating power transformer of FIG. 1 showing a simplified application for the same.

FIG. 7 shows an example of my improved regulating power transformer in the application of a battery charger. The core elements or members as indicated at 50, 51 are formed of E-shaped laminations to define E-shaped cores which are shown schematically in the drawing with an I-shaped core member 52 positioned therebetween to define the magnetic shunt path. The primary winding 55 is adapted to be connected to an alternating current voltage source of power 53 of 100 to 130 volts or preferably approximately 117 volts. The secondary winding 56 has a reduced number of turns to define a step-down transformer providing a secondary output of approximately 15 to 20 volts through a full wave rectifier 57. The control windings 58, 59 mounted on the I-shaped bar member are connected in opposition and in a series circuit to a DC source of power, indicated at 60, which would be approximately 20 volts. In series with the DC circuit is an adjustable rheostat, indicated at 65, by means of which current flow through the windings could be adjusted. In this particular application no feed back circuits or external sensors are required and the output stays constant at certain values with changing supply voltage or changing load impedance within reasonable limits. Depending upon the percentage of regulation required for the application, the thickness of the shunt or the magnetic shunt strip will determine the control range. For example, I have found that a 5 percent regulation range will require a strip width or thickness of approximately one-twentieth or 5 percent of the main magnetic path whereas a 30 percent regulation range requires somewhere around 20 percent of the thickness of main return path.

Figure 8:
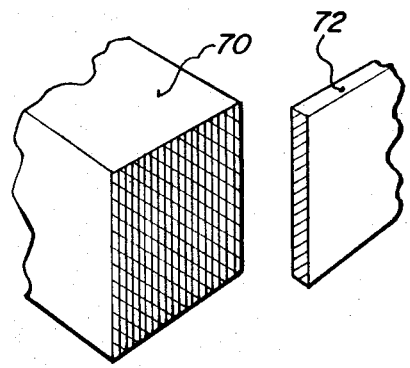
FIG. 8 is a fragmentary perspective view of portions of the core and shunt of the transformer to show variations in materials used therein.

In FIG. 8 is shown a fragmentary portion of a leg extremity, indicated at 70, of the core member with a portion of the I-shaped bar member, indicated at 72, to indicate relative dimensions of the same. For example, the cross section of the face of the leg extremity would have dimensions of 2-¼ by 3 inches with the I-shaped bar member having a 3 inch width and a 0.2 inch thickness. Depending upon desired operating characteristics, the bar member may be made of laminations of different thickness than the laminations employed in the core members such that the permeability of the same will be different. Where an increased thickness in the shaped core member is required for increased regulation, the orientation of the laminations for the same may be such that they will align with those in the core member and be of the same reluctance.

Figure 9:
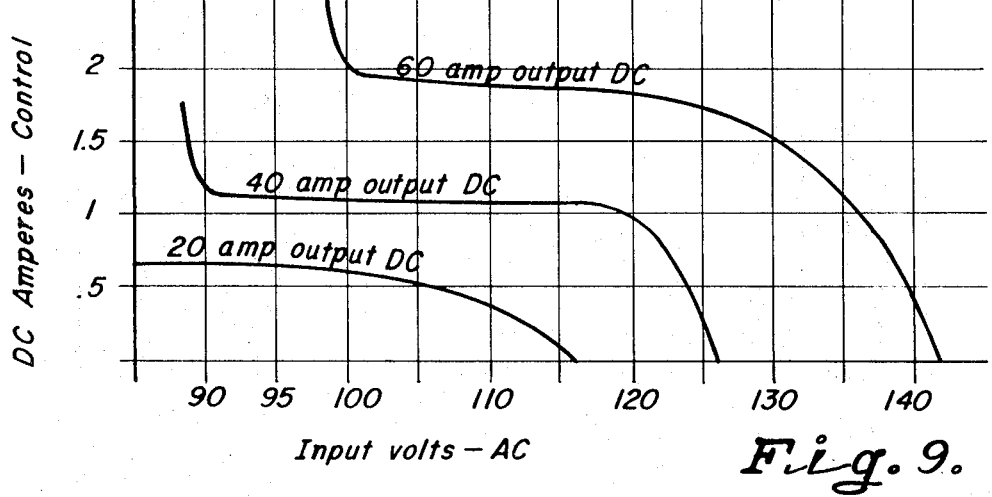
FIG. 9 is a graph of DC control current in the control windings of the regulating transformer versus alternating voltage applied to the primary winding for varying power outputs from the transformer.

As an example of the type of regulation provided from a simplified power transformer using standardized parts, and the magnetic and electric circuit configuration shown in FIG. 7, the graphs on FIG. 9 show a plot of DC control current in amperes versus line voltage variation applied to the primary winding of the transformer for varied direct current outputs obtained from the secondary winding through a rectifying apparatus. Thus, for example, the power control was effective over a range of 95 to 135 volts line voltage to provide constant output currents from the secondary suitable for battery changing application with a substantially constant DC output current.

Figure 10:
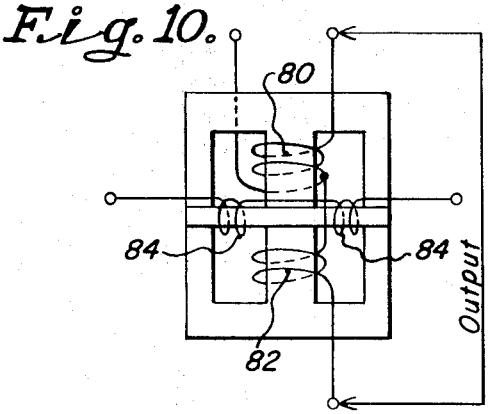
FIG. 10 is a schematic view of the transformer of FIG. 1 connected as an autotransformer.

FIG. 10 shows another application of the regulating power transformer which may use either E- or C-shaped core laminations and a varying sized magnetic shunt. In it, the primary winding 80 has connected thereto one end of the secondary winding 82 to provide a conventional autotransformer circuit configuration. The output is taken between the extremity of the secondary winding and one terminal of the primary winding, with the alternating current source being connected across the primary winding. The DC coil configuration, indicated by the coils 84, are identical with any of the other previous embodiments and would be adapted to be connected to a reference variable direct current source.

Figure 11:
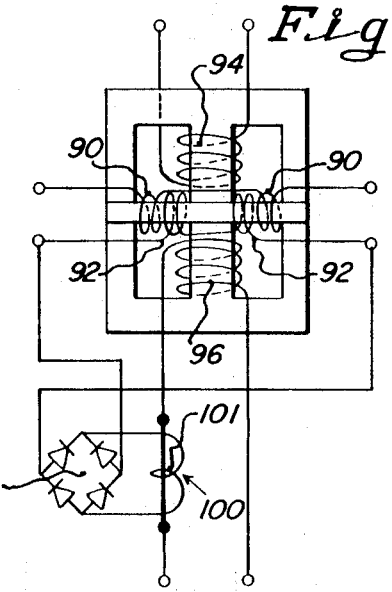
FIG. 11 is a schematic view of another embodiment of the transformer showing dual sets of control windings thereon and showing in addition an application of regulation of the same.
Figure 12:
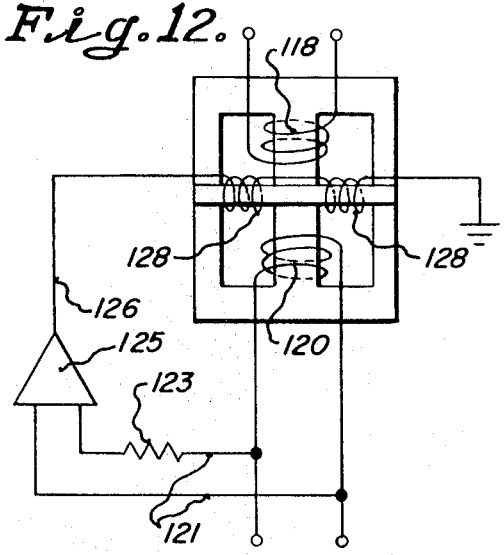
FIG. 12 is a schematic circuit diagram of the transformer showing another application of regulation of the same.
Figure 13:
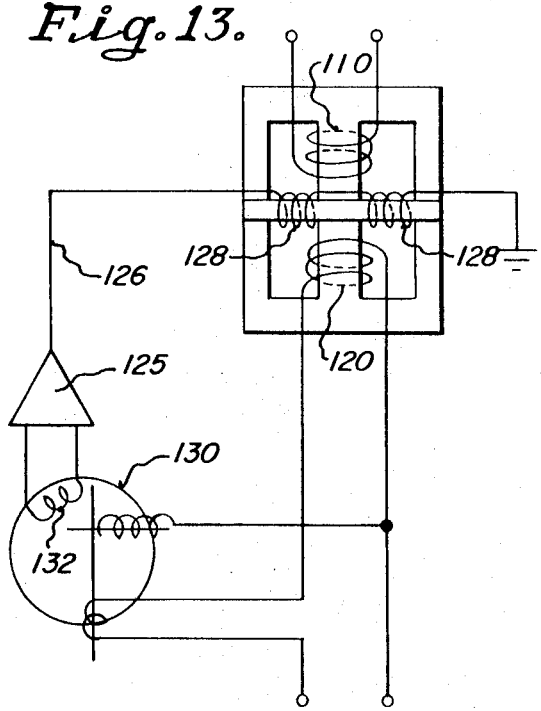
FIG. 13 is another schematic circuit diagram showing a further application of the improved power regulating transformer.

FIG. 11 shows schematically another circuit configuration for my regulating power transformer which utilizes any type of core laminations and any desired magnetic shunt path thickness. It employs two sets of control windings one set indicated by the numeral 90 with the second set indicated by the numeral 92 and with the conventional primary winding 94 and secondary winding 96. One of the sets of control windings, which are connected in opposition, may be connected to a reference or adjustable bias DC supply while the other set may be used as a feed back winding, such as indicated in FIG. 11, wherein the secondary winding is connected through a current transformer, indicated at 100, with the output of the current transformer as indicated by the extremities of the secondary winding 101 being connected through a rectifier 102 and in the series circuit to include the control windings 92. Thus regulation of the alternating current secondary output will be controlled in accord with current flow therethrough with an adjustable bias current also applied to the magnetic shunt. Similar applications are shown in FIGS. 12 and 13 wherein voltage sensing or power sensing circuits are connected into the secondary output and provide the DC control for one set or the only set of control windings on the magnetic shunt. Thus in FIG. 12, the core elements may take any form and the circuit shows schematically the primary winding 110 of the regulating power transformer as adapted to be connected to an alternating current source of power with the secondary winding 120 having connected thereto voltage sensing conductors 121 and including a resistor 123 feeding the control side of an amplifier, indicated schematically at 125, whose output, as indicated by the conductor 126, is connected to and energizes the control windings 128 of the transformer.

FIG. 13 shows schematically the same circuit to indicate that the power or wattage in the secondary output can be sensed through a conventional watt meter type sensor, indicated schematically at 130, with the output, as indicated by the coil 132, taken therefrom to control the amplifier 125. The output 126 of the amplifier is connected to and energizes the control windings 128 of the transformer to control regulation of the transformer.

Figure 14:
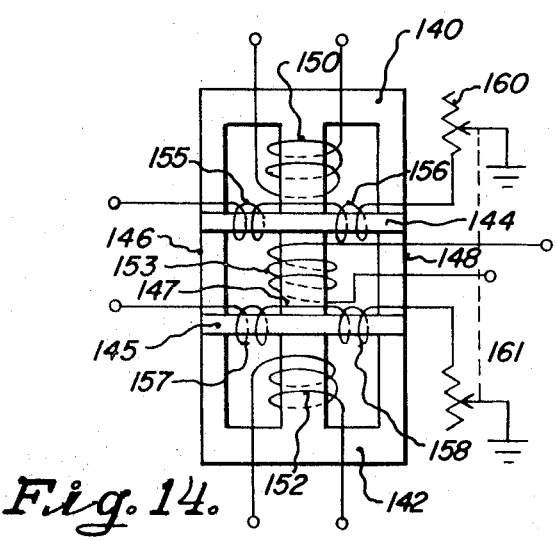
FIG. 14 is a schematic view of an alternate embodiment of the improved regulating power transformer.

FIG. 14 of the drawings shows another embodiment of the improved power regulating transformer with magnetic shunt. It employs the same principles and again utilizes standard transformer lamination to make up the core members. As shown schematically in FIG. 14, this embodiment of the regulating transformer includes a pair of E-shaped core members 140, 142 respectively with a pair of I-shaped core members or magnetic shunts 144, 145 positioned in contact with the leg extremities of the same and with the shunts being separated by straight bar portions 146, 147 and 148 respectively of the same size and dimension as the respective leg portions with which they are aligned and separating the magnetic shunts. This embodiment employs a pair of primary windings 150, 152 positioned on the center legs of the core members 140, 142 respectively with the secondary winding 153 being coaxial therewith and positioned on the enlarged straight bar portion 147 aligned therewith and positioned between the shunts. The outside legs 146, 148 provide the return path for the magnetic flux from the primary windings and suitable control windings 155, 156, 157 and 158 are positioned respectively on the core members 144, 145 and adapted to be connected to separate or parallel energization circuits to be differentially energized. Thus, as will be seen in FIG. 14, the control windings, pairs are connected in series circuit, and each series circuit is connected in parallel circuit to a DC source of power. The opposite extremities of the pairs of windings in series circuit and in opposed relationship are connected respectively through variable resistor controls, indicated schematically at 160 and 161, and to a ground connection with the wipers of the variable resistors being inversely operated such that current flow through one set of windings will increase while the other decreases. The primary windings 150, 152 are adapted to be connected to alternating current sources which are 180° out of phase. Thus, with differential control of the pairs of control windings on the magnetic shunts 144, 145 fading in and fading out of the control currents, a voltage is induced in the center coil or the secondary winding 153 which can be made any relationship in phase with respect to the primary windings. It can also be adjusted with respect to amplitude. This provides a simplified boost circuit with smooth transition and without switching or distortion of wave form. The operation of the individual shunts on the various portions of the magnetic circuit is the same as that provided in the beforementioned embodiment and a simplified magnetic circuit utilizing standard parts is obtained.

FIG. 15 shows the application of the regulating power transformer to a plural phase supply source. In FIG. 15, the core structures are shown schematically as employing C-shaped core members which nest together to give a general E-configuration such that preformed windings may be mounted on the legs thereof and the separate core members formed thereby may be positioned in near abutting relationship with a simplified I-shaped magnetic shunt or core member therebetween. Thus, as is shown in FIG. 15, core elements 170, 171 and 172 will combine to form one core member and similar elements will be utilized to provide the second half of the core member with the I-shaped core structure 180 positioned therebetween. Separate primary windings 190, 191 and 192 will be placed on the respective legs and the secondary windings 193, 194 and 195 will be positioned on the opposite core member to be coaxial therewith. The I-shaped core member will take a pair of control windings 200, 201 which are connected in opposed polarity relationship and in series circuit with the DC control portion of the I-shaped core member being connected to a direct current energizing source which is adjustable or controllable in any of the manners previously described. The resultant transformer is a plural or three phase transformer in which flux flow between the respective primary and secondary windings will be controlled with respect to the shunt path with each pair of windings having complete magnetic circuits. The principle of operation of this transformer is the same as any of the single phase regulating transfomers previously described and a simplified resulting one-piece composite core structure held in assembled relationship will be provided in which the parts of the regulating transformer are standard components.

FIGS. 16 and 17 are graphic disclosures of the relationship between the alternating current and primary voltage and the DC control current. In FIG. 16, curve (a) indicates the alternating current or sine voltage wave form of the excitation of the primary winding while a pulsating DC control current of either a lagging (curve b) or leading (curve c) type may be applied to the DC control windings to modify or alter the wave form of the resultant alternating current output on the secondary winding.

Graph 17 shows a graph at (a) which discloses in wave form a similar shape of the alternating current applied to excite the primary winding of any one of the beforementioned embodiments with graph 17 (b) disclosing a resultant distorted wave form from the secondary winding for certain applications. Graph 17 (c) discloses a pulsating DC control current applied to the control windings which is a composite of a fixed level at energization and a pulsating level of energization. The latter is related in frequency to the distorted wave form to modify the same and produce the undistorted sinusoidal secondary output wave form from the secondary winding as disclosed in graph 17 (d), as an example of use of composite wave form excitation of the DC control windings in this regulating power transformer for output wave correction.

My invention in a regulating power transformer with a variable magnetic shunt is disclosed herein as applicable to standard lamination parts to provide a resultant magnetic structure using substantially less iron than similar types of magnetic control transformers and with preformed windings mounted thereon to provide an economy in design. This improved regulating transformer is suitable for a variety of applications and provides the means for obtaining varied regulation and modification of output wave form. In its simplest from it may be used as a simplified regulating transformer without feed back and is equally applicable to more sophisticated regulating circuits in which the feed back is employed individually or with a bias current to provide improved regulation. Therefore, in considering this invention it should be remembered that the beforementioned disclosure is illustrative only and that the scope of the invention should be determined by the appended claims.

What is claimed is:

1. A regulating power transformer comprising, a magnetic circuit having a principal flux path of substantially uniform cross section defined by a pair of symmetrical core members providing at least a pair of gaps therein separating the circuit into two portions, a magnetic shunt positioned in the gaps and abutting the core members to be held therebetween and having its principal flux path positioned normal to the flux path of the magnetic circuit, the flux path of the magnetic shunt having a cross section substantially reduced from the cross section of the principal flux path, a primary winding positioned on one portion of the magnetic circuit and adapted to be connected to an alternating current source of power, a control winding positioned on the magnetic shunt and distributed thereon such that no alternating current is induced in the control winding from alternating current flux in the magnetic circuit, said control winding being adapted to be connected to an adjustable direct current source of power to control magnetic saturation of the magnetic shunt, and a secondary winding positioned on the other portion of the magnetic circuit and inductively coupled to the primary winding, said secondary winding having a regulated alternating current induced therein.

2. The regulating power transformer of claim 1 in which the portions of the magnetic circuit are formed by stacked E-shaped laminations held together in abutting relationship with the magnetic shunt bridging the same.

3. The regulating power transformer of claim 2 in which the magnetic shunt is formed by stacked I-shaped laminations positioned normal to the E-shaped laminations.

4. The regulating power transformer of claim 1 in which the portions of the magnetic circuit are formed by pairs of C-shaped laminations in stacked relationship and held together in assembled relationship abutting the magnetic shunt.

5. The regulating power transformer of claim 3 in which the primary and secondary windings are preformed coils positioned on the center legs of the opposed E-shaped laminations.

6. The regulating power transformer of claim 4 in which the primary and secondary windings are preformed coils positioned over adjacent legs of the C-shaped laminations defining the main flow path through the transformer.

7. The regulating power transformer of claim 2 in which the magnetic circuit with the principal flux path of substantially uniform cross section is formed by making the center leg of the E-shaped lamination substantially twice the width dimension as the outside legs.

8. The regulating power transformer of claim 3 in which the stacked I-shaped laminations forming the magnetic shunt vary in ratio in cross section of from 5 to 20 percent of the cross section of the principal flux path defined by the center legs of the core members.

9. The regulating power transformer of claim 1 in which the control winding on the magnetic shunt is a pair of coils connected in opposition such that any alternating EMF developed therein with alternating flux flow through the magnetic shunt flux path will cancel out.

10. The regulated power transformer of claim 9 in which the control windings are preformed and mounted on the magnetic shunt and connected in a series circuit without the polarity terminals of the coils being connected in common and with the coils being positioned between and within the core members of the magnetic circuit.

11. The regulated power transformer of claim 5 in which the control winding on the magnetic shunt is a pair of preformed coils connected in a series circuit and with opposite polarity terminals in common and adapted to be connected to a controlled DC source of power.

12. The regulated power transformer of claim 1 and including a feed back circuit means controlling the energization of the DC control winding in proportion to a characteristic of the output taken from the secondary winding.

13. The regulated power transformer of claim 12 in which the output characteristic of the secondary winding to which the energization of the DC winding is to be controlled may be current, voltage or power.

14. The regulated power transformer of claim 11 and including means for holding the stacked E-shaped laminations and the magnetic shunt in assembled relationship.

15. The regulated power transformer of claim 1 in which the magnetic circuit is formed by two E-shaped core members having a central leg and a pair of side legs positioned so that the legs align and with straight bar sections of the same cross section as the legs aligned therewith to define two sets of gaps, and in which the magnetic shunt is a pair of magnetic shunts positioned across each of the sets of gaps and between the E-shaped core members and the straight bar portions in contact with the same, and including a pair of control windings positioned on each magnetic shunt and connected in series circuit with opposite polarity terminals in common and with the pairs of control windings on the pairs of magnetic shunt being connected in series circuit and to a regulating DC source of power and in which the primary winding includes a primary winding on each of the central legs of the E-shaped core members and adapted to be connected to an alternating source of power with the respective windings being connected to sources of power 180° out of phase with one another and with the secondary winding being positioned on the straight bar section aligned with the central legs of the core members.

16. The regulating power transformer of claim 1 in which the direct current source is a pulsating direct current source which is variable with respect to the phase of the alternating current and variable in magnitude such as to produce a regulating control over the output of the secondary.

17. The regulating power transformer of claim 16 in which the DC regulating source has a complex wave shape to modify the alternating current wave shape generated in the secondary winding.

18. The regulating power transformer of claim 1 in which the primary and secondary windings positioned on the principal flux path of the magnetic circuit are distributed over various portions of the same.

19. The regulating power transformer of claim 1 in which the primary and secondary windings are electrically connected to provide an autotransformer configuration.

20. The regulating power transformer of claim 1 in which the magnetic circuit and the magnetic shunt are made of magnetic materials having different magnetic permeability.

21. A regulating power transformer comprising, a pair of E-shaped core members each formed by a stack of E-shaped magnetic laminations positioned together in near abutting relationship, a layer of I-type laminations positioned in abutting contact with the E-shaped core members and separating the same, a primary and a secondary winding positioned coaxial of the center legs of the E-shaped core members and separated by the I-type laminations with the primary winding being adapted to be connected to an alternating current source of power, a pair of coils positioned around the I-type laminations fitted into the windows of the E-shaped core members in near abutting relationship and adapted to be connected to an adjustable direct current source of excitation, said I-shaped laminations serving as a magnetic shunt for the flux generated by the primary coil and as a coupling between the E-shaped core members, circuit means energizing the coils on the I-type laminations to saturate the shunt path reducing the amount of bypassed alternating magnetic flux generated by the primary winding and directing it through the secondary winding in a direct proportion to the direct current excitation of the coils on the magnetic shunt.

22. The regulating power transformer of claim 21 in which the I-type laminations provide a magnetic path between the E-type cores and a shunt path between said cores with this shunt path being traversed by two sets of magnetic fluxes essentially perpendicular to one another with one of said fluxes being of controlled magnitude and fixed direction and the other perpendicular to it and of alternating fluctuation and of essentially constant magnitude, the alternating flux being varied by fluctuations in the energization of the primary winding and additionally altered by fluctuations in the load connected to the secondary winding with said output response in the secondary winding being substantially instantaneous due to change in flux direction being only a 90° angle.

23. The regulating power transformer of claim 22 in which the I-shaped laminations have a plurality of pairs of exciting coils mounted on the I-shaped laminations for controlling the flux flow through the shunt path with each pair of coils being adapted to be connected to separate energization circuits.

24. The regulating power transformer of claim 22 in which the number of magnetic shunts are two and a pair of primary windings connected to separate alternating current source 180° phase angle apart are positioned thereon with a secondary coil positioned in between the magnetic shunts and with the magnetic shunts having separate pairs of energization coils thereon such that phase angle output in the secondary coil may be varied by simultaneously increasing and decreasing the magnitudes of the DC control excitation in the respective coil pairs on the magnetic shunts.

25. The regulating power transformer of claim 21 in which the magnetic shunt formed by the I-shaped laminations may be made of a magnetic material different than the laminations forming the E-shaped core.

26. The regulating power transformer of claim 21 in which the adjustable direct current source of excitation is a pulsating direct current source which is adjustable in magnitude and phase angle with respect to the alternating current source of power connected to the primary winding.

27. The regulating power transformer of claim 26 in which the direct current source of excitation is a pulsating direct current source having a complex wave form adapted to modify the alternating current wave shape generated by the secondary winding.

* * * * *